Patented Dec. 2, 1930

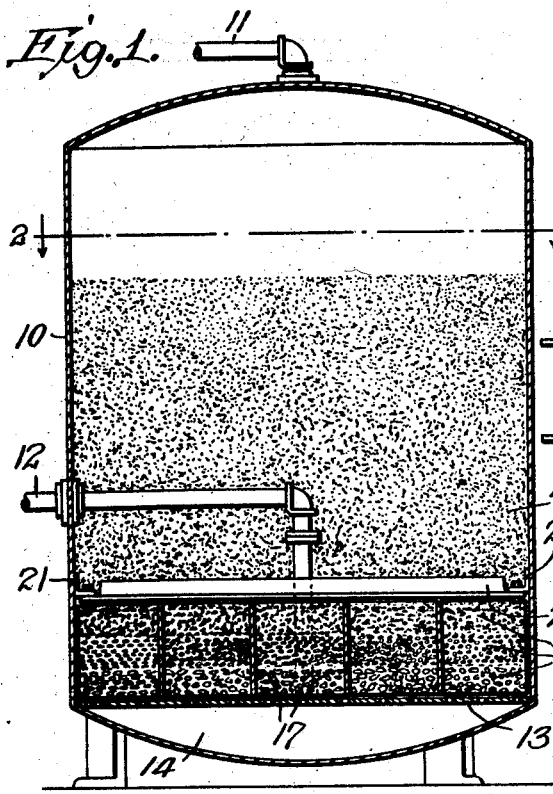
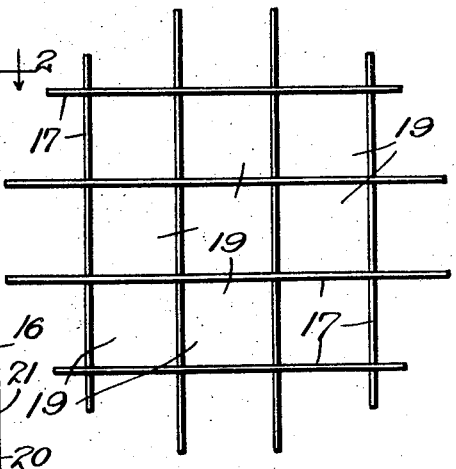
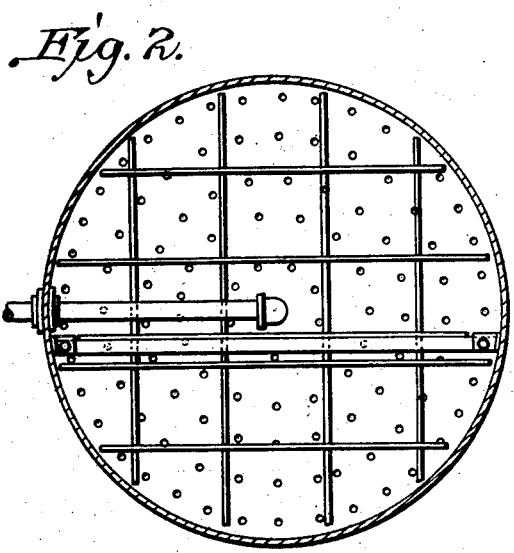
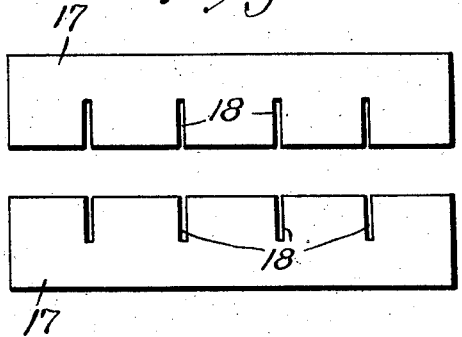
Inventor
ROBERT O. FRIEND
By
Attorney

1,783,466

UNITED STATES PATENT OFFICE

ROBERT O. FRIEND, OF CHICAGO, ILLINOIS

CONSTRUCTION OF ZEOLITE WATER SOFTENERS

Application filed June 11, 1928. Serial No. 284,631.

REISSUED

This invention relates to water softeners of the type in which a bed of gravel or sand is placed upon a perforated strainer plate or screen to support the zeolite mineral within the softening tank.

In this type of water softener it is exceedingly difficult to prevent the gravel or sand bed from rupturing or "blowing" under the pressure of the water and from shifting horizontally in the tank. When this blowing or shifting occurs the zeolite mineral will flow through the gravel bed during the return flow or salting process allowing it to escape through the screen or strainer. This not only results in the loss of the zeolite mineral but also causes an unequal flow through the bed so that only a small portion thereof will be actually used in the softening process.

The principal object of this invention is to provide means for preventing disruption or disarrangement of the gravel bed so that it will always be maintained uniformly distributed over the entire area of the strainer plate.
Another disadvantage of the present gravel bed system resides in the fact that the water flowing upwardly therethrough will follow lines of the least resistance and form paths or channels through the bed owing to the irregularity in the gravel interstices. This causes the major portion of the water to follow well defined paths through the zeolite and avoid portions thereof. Another object of this invention is to provide means which will cause the water to flow directly upward over the entire area of the gravel bed and prevent the formation of lateral paths or channels.

A further object of the invention is to so construct the bed retaining members that they can be passed through a relatively small opening in the softening tank and quickly and easily assembled therein.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

Fig. 1 is a vertical section through a typical water softening tank with the invention in place therein.

Fig. 2 is a horizontal section taken on the line 2—2, Fig. 1, with the zeolite mineral and gravel removed.

Fig. 3 is a detail view illustrating, in side elevation, two typical partition plates as employed in the invention.

Fig. 4 is a detail plan view illustrating the partition plates in the assembled relation.

In the drawing, a water softening tank is illustrated at 10 provided with the usual outlet and inlet pipes 11 and 12, respectively. In the bottom of the tank 10 a perforated strainer plate 13 is placed. The inlet pipe 12 extends downwardly through the center of the strainer plate 13 and discharges into an intake chamber 14 below the plate 13. The water then flows upwardly from the chamber 14 through the perforations in the plate 13 and discharges through the outlet pipe 11.

It is usual in constructions of this character to place several beds of gravel 15 upon the strainer plate 13. Usually these beds are arranged with the coarsest gravel in the bottom and the finest at the top so that the upwardly flowing water will be dispersed into a multitude of small streams in its passage through the bed. Upon the uppermost gravel bed 15 the zeolite mineral, indicated at 16, is placed, the finer gravel bed preventing it from reaching the strainer plate 13.

The invention is designed to prevent disruption or disarrangement of the gravel beds 15 and to prevent the water from forming lateral channels therein. It comprises a series of spaced apart notches 18, extending substantially half way through the plate as illustrated in Fig. 3. In assembling, the partition plates which run in one direction are turned with their notches 18 upwardly. The plates running in the lateral direction are turned with their notches 18 downwardly and passed into the notches 18 of the first positioned plates. The plates are therefore self sustaining and form a series of rectangular cells 19 having a depth equal to the width of the plates. The partition plates 17 are of a length sufficient to extend across the width of the strainer plate 13 as illustrated in Fig. 2.

It is usually found desirable to provide means for preventing the assembled partition plates from being forced upwardly in the gravel bed. This may be accomplished by means of a cross bar 20 extending across the interior of the tank 10, immediately above the partition plates. The cross bar 20 may be secured to angle clips 21 upon the tank 10 to maintain it in position.

It can be readily seen that with this construction the gravel bed is divided into a series of substantially equal parts by the cells 19, each part receiving its proportion of total flow of the water. Any cross channeling is confined to a particular cell by the partition plates 17 and the entire bed is prevented from shifting horizontally so that its thickness is maintained uniform throughout its area.

The interlocking construction of the partition plates, provided by the slots 18, allows the plates to be passed through the usual hand hole with which tanks of this nature are provided and enables them to be quickly and easily assembled within the tank without the use of tools, rivets, etc. When it is desired to clean out the entire tank and remove the mineral and gravel the plates can be simply lifted individually from place and removed through the hand hole.

While a specific form of the improvement has been described and illustrated herein, it is desired to be understood that the same may be varied, within the scope of the appended claims, without departing from the spirit of the invention.

Having thus described the invention, what is claimed and desired to be secured by Letters Patent is:—

1. Means for preventing disrupting of the gravel bed in a zeolite water softener comprising: a series of relatively flat plates intersecting each other, said plates being notched at the intersecting points so as to pass into each other and maintain themselves upright; and means for maintaining the series of plates in said bed comprising: a cross member arranged to rest upon the upper edges thereof.

2. In a water softener comprising: a cylindrical tank having a screen in the bottom thereof, means for preventing disruption of a gravel bed upon said screen comprising: a series of detachably intersecting, vertically placed plates forming cells above said screen, said series having a lesser diameter than the interior of said tank so that the plates may be placed in position within said tank from the top thereof; and means for holding said plates against said screen comprising: a removable cross-section bar arranged to rest on the upper edges of said plate.

ROBERT O. FRIEND.